C. S. LOCKWOOD.
ROLLER BEARING CAGE.
APPLICATION FILED MAY 5, 1920.
1,365,596. Patented Jan. 11, 1921.
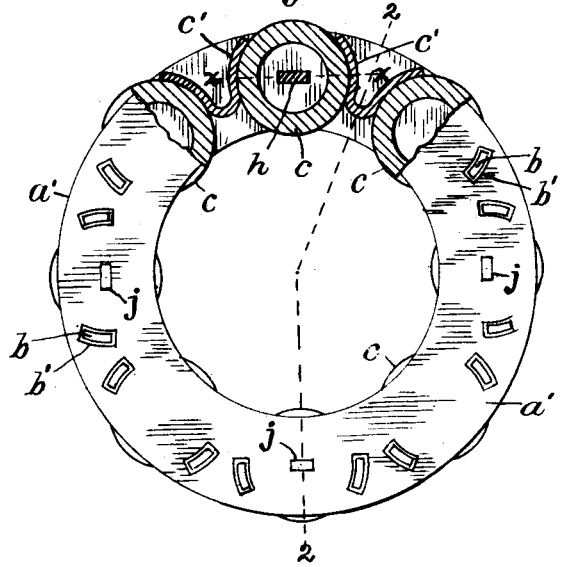
Fig. 1.
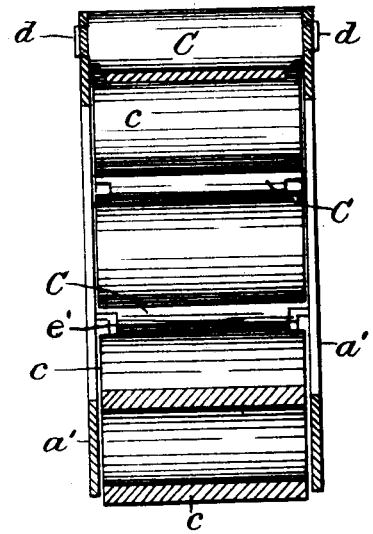
Fig. 2.
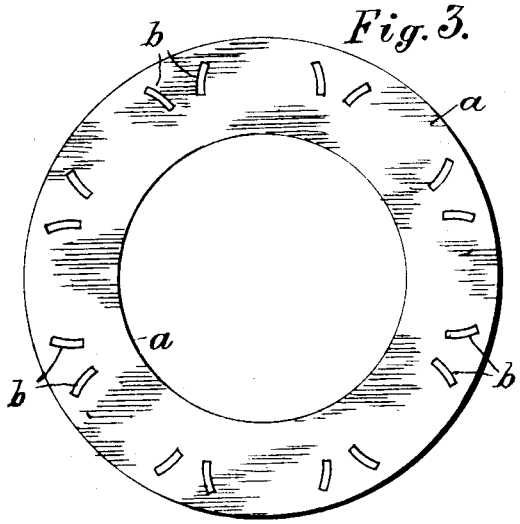
Fig. 3.
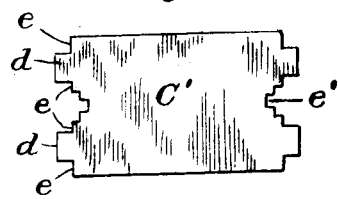
Fig. 4.
Fig. 5.
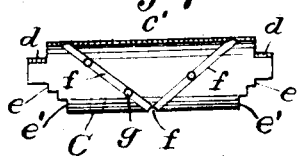
Fig. 7.
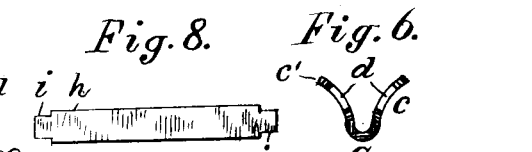
Fig. 8. Fig. 6.
Inventor.
Charles S. Lockwood,
Thomas S. Crane, Atty.

UNITED STATES PATENT OFFICE.

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

ROLLER-BEARING CAGE.

1,365,596.        Specification of Letters Patent.        Patented Jan. 11, 1921.

Application filed May 5, 1920. Serial No. 379,002.

*To whom it may concern:*

Be it known that I, CHARLES S. LOCKWOOD, a citizen of the United States, residing at 496 Clinton avenue, Newark, county of Essex, and State of New Jersey, have invented certain new and useful Improvements in Roller-Bearing Cages, fully described and represented in the following specification and the accompanying drawings, forming a part of the same.

This invention relates to roller-bearings in which a set of cylindrical rolls is arranged in a circular series and retained in position by a cage.

Such rolls, with a cage adapted to retain them in place therein, form a self-contained set adapted for handling or transportation when withdrawn from the bearing.

It is understood that such roll-sets are adapted for application to a shaft fitted snugly within the rolls and to a casing fitted snugly to the outer sides of the rolls.

The chief object of the invention is to furnish a cage which may be constructed wholly of sheet-metal and which affords great strength in connection with cheapness of production.

Another object of the invention is to furnish a construction in which the assembling and securing of the parts together may be effected without the use of "holding-jigs," to keep the parts in alinement while securing them together.

Another object of the invention is to secure a rigid connection between the tie-bars and the head, which is effected by forming each tie-bar with four points of support upon the head so that the tie-bars are wholly prevented from tipping or yielding.

To obtain a four-point bearing for the ends of the tie-bars upon the head, the tie-bars are formed of sheet-metal by stamping a flat blank into trough-shape with two tenons upon each end, and shoulders upon the tie-bars at opposite sides of the tenons.

I secure by the operation of these shoulders a four-point contact with the head at each end of each tie-bar.

Other details of the invention will be set forth and claimed as illustrated in the annexed drawing, in which Figure 1 is a side elevation of a set of rolls with the cage and adjacent ends of the parts broken away in the upper part of the figure; Fig. 2 is a longitudinal section of the roll-set taken on line 2—2 in Fig. 1; Fig. 3 shows the inner side of one of the heads; Fig. 4 shows the "blank" for a tie-bar; Fig. 5 is a plan, and Fig. 6 an end view of the tie-bar stamped from such blank. Fig. 7 is a side elevation of one of the tie-bars, a portion of such elevation being shown at C in Fig. 2; and Fig. 8 is a side view of an auxiliary tie-bar.

$a$ designates the inner side of the head in Fig. 3, and $a'$ the outer side of the head in Fig. 1.

Eight pairs of mortises $b$ are shown formed in a circular series through the heads, and the outer ends of such mortises countersunk at $b'$, as shown in Fig. 1, into which the tenons of the tie-bars may be expanded. The drawing shows a cage adapted to hold eight rolls $c$, the cage-head being connected by tie-bars C formed of sheet-metal of trough-shape with two wings $c'$ curved to embrace the adjacent sides of two rolls.

Each wing has tenons $d$ at opposite ends, with shoulders $e$ at opposite sides of each tenon which bear upon the inner side of the heads at four points (two at each tenon.)

The tenons project from the wings in pairs, as shown in Fig. 5, and the mortises $b$ are similarly formed in pairs to receive such tenons.

The tenons $d$ are shown in Fig. 2 projecting through the heads, as when first inserted in the mortises, but are finally pressed flush with the heads by expansion into the countersink $b'$ so that the outer faces of the finished cage have no projections whatever.

The rolls, as indicated by comparison of the tie-bars C and rolls $c$ in Fig. 2, are made a little shorter than the tie-bars so as to avoid pressure or rubbing against the heads.

Each tie-bar is formed of a flat blank of sheet-metal designated C' in Fig. 4, and is so proportioned and stamped of such trough-shape that the sides of the tie-bars at the bottom portion of the trough extend within the center line of the adjacent rolls, which line is indicated in Fig. 1 by the dotted line $x$—$x$.

The curvature of the wings thus extends inwardly and outwardly from the center line of the rolls so that the wings prevent the rolls from displacement inwardly or outwardly upon the cage, while permitting them to turn freely between the wings.

It is to be understood that the fitting of the wings to the rolls is made with sufficient clearance to permit the rolls to turn freely without allowing their escape from the embrace of the wings, which is necessary to hold the rolls in the cage in handling or transportation.

This cage may be used in connection with rolls formed of spirally wound strands, which rolls are already extensively in use, and which permit a free circulation of oil through the crevices between the strands; or the cage may be used with solid rolls or with tubular rolls such as are shown at $c$ in the drawing.

Means of lubricating the contact of the rolls and tie-bars is shown in Figs. 5 and 7 in the form of sloping grooves $f$ formed in the exterior of the wings and used with or without holes $g$ leading from the interior of the trough into such grooves.

This construction permits any oil which is placed in the bearing to penetrate through the wings to the grooves $g$ and distribute oil upon the surfaces of the rolls.

Where the bearing is subjected to great strain or requires especial strength, auxiliary tie-bars $h$, such as are shown in Fig. 8, may be inserted through the rolls, as shown in the upper part of Fig. 1, and tenons $i$ upon the ends of such bars secured in mortises $j$ prepared in the head for such purpose.

The tenons in the structure may be riveted to the heads by an electric current, as is employed in electric riveting, or by pressure or hammering; and the parts are so proportioned that when the riveting is completed the exterior of the cage-heads would be free from any projection.

The provision of the four-point bearing at each end of the tie-bar operates to square each of the tie-bars with the heads, and in the aggregate the shoulders at the tenons serve to hold the heads firmly in the desired relation to the tie-bars when securing the heads thereon, and to give the cage great rigidity in use. The construction avoids the necessity of jigs to support the parts in the proper relation while securing them together, and it forms a self-contained roll-set with the cage formed wholly of sheet-metal. It will be understood that the invention is applicable to a cage proportioned to receive any desired number of rolls, and that the essential feature of invention is the formation of the tie-bars from sheet-metal with two tenons at each end secured in the heads and provided with two shoulders in contact with the heads.

Each of the two tenons at the end of the tie-bar has an independent hold upon the cage-head and coöperates with the other tenons upon such tie-bar to prevent any bending or yielding of the tie-bar where connected with the head.

It will be understood that the rolls may be guided centrally between the two heads by the guide-ring or collar described in my Patent No. 1,324,833.

Such device prevents the crowding of the rolls toward the heads with the resulting wear and frictional resistance.

It will be noticed that the ends of the blank shown in Fig. 4 are provided with a notch $e'$ which extends into the center part of the bar where the fold is made between the two wings $t'$ in shaping the tie-bar.

These notches, as shown in Fig. 7 make the fold shorter than the length between the shoulders $e$.

The purpose of these notches $e'$ is to prevent the swelling or thickening of the metal at the ends of the fold which would produce a "bur" or rough edge upon the metal which would have to be removed in some manner.

By forming the notches $e'$ in the blank, the bend which forms the fold produces no deforming effect at the ends of the tie-bar which would distort the shoulders of the tenons, and wholly avoids the necessity of any finishing operation after the blank is bent into the shape required.

The formation of the tie-bar thus requires only the simple operations of stamping out the blank and then with suitable dies bending the blank to the required form.

Having thus set forth the nature of the invention what is claimed herein is:

1. A self-contained roll-set, comprising the cage having heads with plane faces and the circular series of mortises countersunk upon the outer sides of the heads, and sheet-metal tie-bars of trough-shape having curved wings, each tie-bar having at its end two tenons located upon the wings midway between the inner and outer edges of the tie-bars, and riveted in the mortises, the shoulders at the sides of such tenons bearing upon the heads at four points, and rolls a little shorter than the tie-bar held by the curved wings from displacement in the cage.

2. A self-contained roll-set, comprising a cage having heads with plane faces and a circular series of mortises, and sheet-metal tie-bars of trough-shape each having at the ends two tenons secured in the mortises, the tenons being located upon the wings midway between the inner and outer edges of the tie-bars, and the wings of the tie-bars projecting inwardly and outwardly from the tenons and having shoulders at the sides of such tenons bearing upon the heads at four points to form a rigid connection therewith, the tie-bars embracing both the inner and outer sides of the roll, past the center lines of the adjacent rolls, sufficiently to hold the rolls from displacement inwardly or outwardly between the tie-bars.

3. The combination, with cage-heads having mortises as described, of sheet-metal tie-bars of trough-shape having curved wings at the sides with two tenons at each end and shoulders at the sides of such tenons, and a notch intermediate to the tenons at each end of the tie-bar to permit formation without swelling of the ends in bending.

4. The combination, with cage-heads having mortises, as described, of sheet-metal tie-bars of trough-shape having curved wings at the sides, with two tenons at each end located midway between the inner and outer edges of the wings and secured in the mortises, and the outer sides of the wings provided next the rolls with lubricating grooves, and holes leading from the interior of the tie-bar into the grooves to distribute lubricant to the rolls.

In testimony whereof I have hereunto set my hand.

CHARLES S. LOCKWOOD.